Nov. 16, 1965 J. G. BADGER 3,218,588

TELEVISION TUNER

Filed June 30, 1961 4 Sheets-Sheet 1

INVENTOR.

JOE G. BADGER

BY MASON, KOLEHMAINEN, RATHBURN & WYSS

ATTORNEYS

Nov. 16, 1965 J. G. BADGER 3,218,588

TELEVISION TUNER

Filed June 30, 1961 4 Sheets-Sheet 2

INVENTOR.
JOE G. BADGER
BY MASON, KOLEHMAINEN,
RATHBURN & WYSS
ATTORNEYS

Nov. 16, 1965 J. G. BADGER 3,218,588

TELEVISION TUNER

Filed June 30, 1961 4 Sheets-Sheet 3

INVENTOR.

JOE G. BADGER

BY MASON, KOLEHMAINEN, RATHBURN & WYSS

ATTORNEYS

Nov. 16, 1965 J. G. BADGER 3,218,588

TELEVISION TUNER

Filed June 30, 1961 4 Sheets-Sheet 4

INVENTOR.
JOE G. BADGER
BY MASON, KOLEHMAINEN,
RATHBURN & WYSS

United States Patent Office
3,218,588
Patented Nov. 16, 1965

3,218,588

TELEVISION TUNER

Joe G. Badger, Bloomington, Ind., assignor to Sarkes Targian Inc., Bloomington, Ind., a corporation of Indiana Filed June 30, 1961, Ser. No. 121,210
9 Claims. (Cl. 334—51)

The present invention relates to television tuners, and more particularly, to television tuners of the type which employ a station selector shaft having a plurality of channel selecting positions, one position being provided for each television channel to be received.

Present-day television tuners of the rotary type include an incrementally rotatable channel selector shaft for selectively connecting certain ones of a plurality of tuned circuit elements into operative circuit relationship with other tuner elements for each of a plurality of channel selecting positions. Because of a difficulty of accurately setting the values of the tuned circuit elements, and because of the desirability of accurately tuning the local oscillator for clear reception in each of the channel positions of the station selector shaft, it is customary to include in the oscillator circuit an impedance device having an adjustable value. This impedance device, which may be either an inductance or a capacitor, is conventionally adjusted by means of a vernier or fine tuning shaft, frequently concentrically mounted with respect to the channel selector shaft, which is connected to the adjustable impedance and is adjustable by the viewer for each different channel.

Various memory fine tuning arrangements have been proposed to eliminate the necessity for adjustment of the vernier tuning shaft of the tuner by the user in each channel position of the station selector shaft. One such arrangement employs a single vernier tuning impedance which is operatively connected in the oscillator circuit at all times and is automatically adjusted by a memory tuning mechanism in each channel selecting position of the selector shaft so as to provide a desired setting of the vernier tuning impedance, which setting may, however, be changed manually by the user if desired. Such an arrangement is described and claimed in U.S. Patent No. 2,947,866 issued August 2, 1960, to Alarico A. Valdettaro and Stanley R. Meadows, and assigned to the same assignee as the present application. In accordance with the present invention the manual adjustment of vernier tuning by the user is accomplished by manipulation of the fine tuning knob in the conventional manner while at the same time providing a memory tuning function so that the user is aware that memory fine tuning is provided only by the fact that he does not have to adjust the fine tuning knob very frequently.

It is becoming increasingly popular with television receiving sets to provide motor driven means for controlling the positioning of the station selector shaft, generally from a remote control location. In such instances, it is particularly desirable that a memory fine tuning function is provided so that fine tuning will be automatically accomplished during the selection of the desired channel and at the same time it is desirable to provide means for the users of the television receivers manually to adjust the fine tuning device. Additionally, it is desirable that the remote controlled motor driven television tuner stop at selectable channel positions and that the particular channel positions at which the television tuner stops are readily selectable by the operator of the set at will. Furthermore, it is desirable to provide facilities for selecting active channel positions without providing additional knobs or controls on the front panel of the receiver.

It is, therefore, an object of the present invention to provide a new and improved television tuner wherein an improved memory fine tuning arrangement is provided for automatically adjusting the fine tuning of the tuner in each channel selecting position of the station selector shaft.

It is a further object of the present invention to provide a new and improved television tuner wherein the fine tuning in each of the channel selecting positions is automatically accomplished while, at the same time, providing an arrangement whereby the user can manually readjust the fine tuning in any channel by manipulation of the fine tuning knob in the conventional manner.

It is another object of the present invention to provide a new and improved television tuner wherein motor driven facilities are provided for automatically rotating the channel selector shaft to preselected active channel positions while, at the same time, providing automatic adjustment of the fine tuning in each of these active channel positions.

It is a still further object of the present invention to provide a new and improved television tuner wherein motor driven facilities are provided for rotating the channel selector shaft of the tuner to desired channel selecting positions and wherein designation of particular channel positions as active channels can be accomplished by the user by manipulation of the conventional fine tuning knob of the tuner.

It is another object of the present invention to provide a new and improved television tuner which includes a single fine tuning impedance together with facilities for automatically adjusting the value of this impedance in each channel selecting position of the main tuning shaft of the tuner.

It is still another object of the present invention to provide a new and improved television tuner wherein a new and improved memory fine tuning mechanism is provided which cooperates with motor driven facilities for permitting the user to select which of the available channels will be selectable as active channels.

It is a further object of the present invention to provide a new and improved television tuner having fine tuning means which is settable to control the remote operation of the tuner.

Briefly, in accordance with the present invention, a memory fine tuning mechanism is provided by employing a number of individually adjustable elements which are rotatable with the channel selector shaft of the tuner. In one embodiment these individual elements may all act successively to position a common vernier tuning impedance while in another embodiment of the invention these elements may be individually associated with the different oscillator coils which are employed in tuning the tuner to different television channels. With either embodiment, the fine tuning knob of the tuner, which is concentric with the station selector knob of the tuner, is releasably engageable with a selected one of these adjustable elements by means of a slip clutch arrangement which is effective to engage the fine tuning knob with the selected adjustable element upon rotation of the fine tuning knob in either direction. Upon further rotation of the knob after it has become engaged with the adjustable element the adjustable element is adjusted in position so that the desired fine tuning may be effected in any channel position of the tuner. However, upon release of the fine tuning knob this knob is disconnected from the adjustable element and remains disconnected therefrom until a fine tuning adjustment on another adjustable element is required.

In accordance wtih a further feature of the invention, motor driven facilities are provided for automatically rotating the channel selector shaft of the tuner in response to an initiating impulse which may be remotely produced.

The motor driven facilities will rotate the shaft until the next active channel is encountered. In order to permit the user to preselect any of the 12 available channels as active channels within his receiving area, facilities are provided for designation of a channel as an active or inactive channel by manipulation of the fine tuning knob of the tuner. More particularly, when the user wishes to designate a channel as an inactive channel, he rotates the station selector shaft to this particular channel and then rotates the fine tuning knob in a particular direction until a stop is encountered. When this occurs the motor driven facilities are set up so that they will not stop the channel selector shaft on this particular channel selecting position. In this manner the tuner can be set up so that it can be stopped only on a few desired channel positions which are active in the particular receiving area and thereafter the motor driven facilities will function to stop the tuner only at these selected channel positions. However, these positions can be changed at will by merely manipulating the fine tuning control knob of the tuner in the manner described above.

The nature of the invention will best be understood when described in connection with accompanying drawings, in which.

Figure 1:
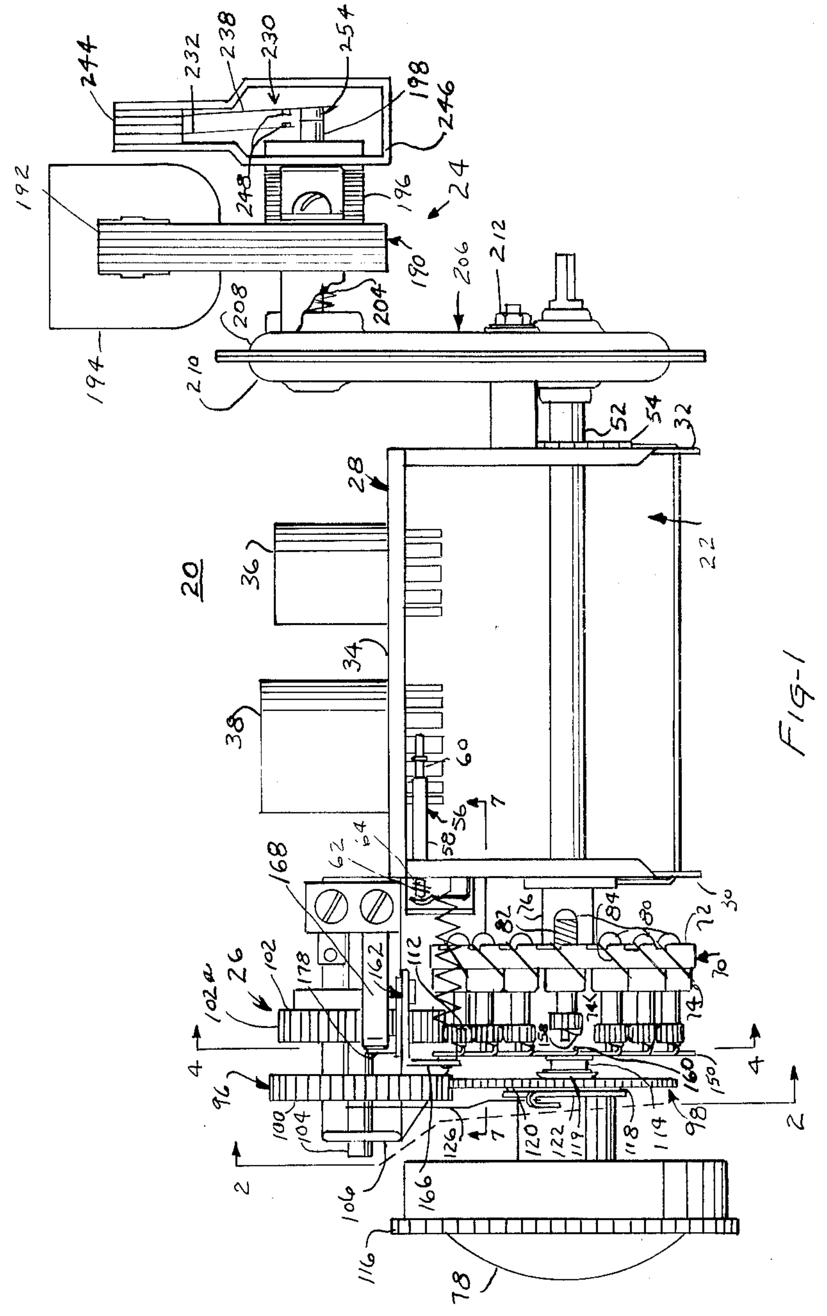
FIG. 1 is a side elevational view of an improved television tuner according to the present invention.
Figure 2:
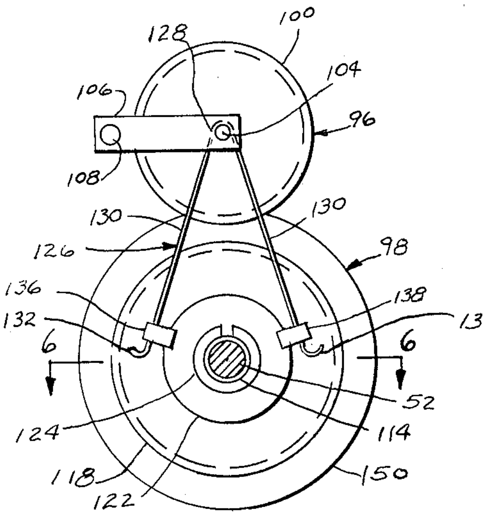
FIG. 2 is a sectional front view of the television tuner of FIG. 1 taken along line 2—2 of FIG. 1 and illustrating fine tuning arrangement in disengaged position.
Figure 3:
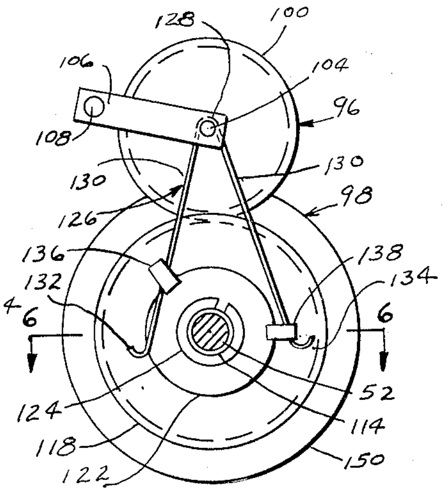
FIG. 3 is a sectional front view of the improved television tuner similar to that of FIG. 2 but illustrating the fine tuning arrangement in an engaged position.
Figure 4:
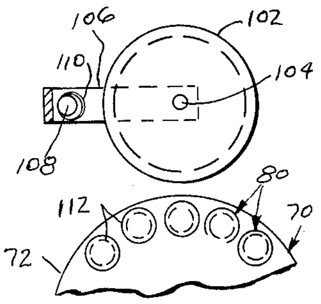
FIG. 4 is a sectional front view taken along line 4—4 of FIG. 1 and further illustrating the fine tuning arrangement in a disengaged position.
Figure 5:
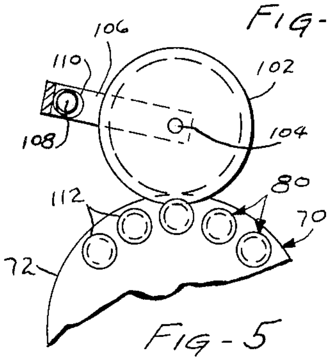
FIG. 5 is a sectional front view of the improved television tuner similar to that of FIG. 4 but illustrating the fine tuning arrangement in an engaged position.

Referring now to the drawings, and particularly to the embodiment of FIGS. 1 to 13, there is illustrated in FIG. 1 thereof the improved television tuner 20 and comprising an oscillator portion 22, a motor drive portion 24, and a memory tuning portion and channel selector 26. The television tuner 20 includes a substantially U-shaped chassis 28 having a front and a rear wall 30 and 32, respectively, and a top deck portion 34 on which are mounted the tube sockets for a pair of tubes 36 and 38. The oscillator portion 22 contains a rotary channel selector means (not shown), the forward end of which is supported by the front wall 30 and the rear end of which is supported by the rear wall 32. The channel selector means is controlled by a main tuning or channel selector shaft 52. In accordance with conventional practice, different ones of a plurality of tuned circuit elements are operatively connected in the television receiving circuit for each angular channel selecting position of the selector shaft 52. Moreover, a suitable detent assembly 54 is effectively interconnected between the selector shaft 52 and the chassis 28 to facilitate the accurate angular positioning the selector shaft 52 in each of its channel selecting positions. Accordingly, as the shaft 52 is rotated to successive channel selecting positions, a plurality of tuning elements are respectively connected in circuit with the antenna, mixer, and oscillator sections of the tuner for each of the channel selecting positions of the selector shaft 52. As the main tuning shaft 52 is rotated to retune the receiver, different ones of these tuned circuit elements are connected into circuit relationship with the oscillator circuit, thereby to selectively control the frequency of oscillation thereof.

In order to permit fine adjustment of the frequency of oscillation of the oscillator for each channel selecting position of the selector shaft 52, a variable tuning impedance, shown generally at 56, is connected in the oscillator circuit to enable adjustment of the frequency of oscillation of the oscillator throughout a relatively narrow range as compared to the range of frequencies controlled by the tuned circuit elements of the channel selector means as the selector shaft 52 is rotated through 360 degrees. As shown, the variable impedance 56 comprises a tubular support member 58 formed of an insulating material such, for example, as glass or ceramic, on which a pair of conductive elements are disposed in spaced apart relation. A conductive slug 60, which is preferably cylindrical in cross section, is slidably mounted in the bore of the support member 58 so that axial movement of the slug 60 within the member 58 adjusts the value of reactance in the circuit. The manner in which the impedance 56 is connected in circuit relation with the oscillator is known in the art and is more fully described, for example, in the aforementioned patent of Valdettaro and Meadows and need not be herein described.

In order to provide for varying the reactance of the impedance 56, the conductive slug 60 is secured to an insulated rod or movable element 62 which extends through an aperture in the front wall 30 of the chassis 28. A compression spring 64 biases the rod 62 outwardly so that the conductive slug 60 is urged into the tubular support member 58. Axial movement of the insulated rod 62 and the conductive slug 60 secured thereto is effective to vary the reactance of the impedance 56 and to fine-tune the oscillator circuit of the television receiving set.

In order to selectively adjust the variable tuning impedance 56 and to provide for operator selection of the desired channels, at each of the selected positions of the selector shaft 52, there is provided the memory tuning portion 26 secured to the front wall 30 of the chassis 28, and best illustrated in FIG. 1. The memory tuning portion 26 includes a cam assembly 70 including a first or back cam support plate 72 containing a plurality of bosses 74 each provided with an aperture and each of which represents a channel selecting position of the selector shaft 52. The cam support plate 72 contains a central boss 76 provided with a central bore through which the selector shaft 52 passes. The cam support plate 72 is keyed or otherwise secured to the selector shaft 52 so as to rotate with the selector shaft 52. The selector shaft 52 is further provided with a channel selector knob 78 keyed or otherwise secured to the selector shaft 52 to provide for manual rotation of the selector shaft 52 and simultaneous rotation of the cam support plate 72.

In order to provide for independent adjustment of the variable tuning impedance 56 at each of the channel selecting positions of the selector shaft 52, there is provided a plurality of independently adjustable cam members 80, each of which is positioned in an aperture in each of the bosses 74. Each of the cam members 80 is provided with a threaded portion 82 at its inner end and a hairpin type spring 84 is provided for each of the cam members 80 and positioned with one inner leg thereof biased into the root of the thread in the threaded portion 82, and secured in position by the engagement of the other leg thereof with its respective boss 74 on the opposite side of the cam support plate 72. In this manner, the cooperation between the hairpin spring 84 and the threads in the threaded portion 82 of the cam members 80 is effective to provide for threading the cam members into or out of the apertures in the support plate 72 upon rotation of the cam members 80.

In order to adjustably position the movable element 62 of the variable impedance 56 with respect to the selected one of the cam members 80, there is provided a cam follower element 86 (FIG. 7) having one end 86*a* thereof pivotally positioned in an aperture 88 in a side wall portion 90 secured to the chassis 28 and having the other end thereof engaging the movable element 62 of the variable impedance 56. The cam follower element 86 is biased outwardly from the variable impedance 56 by the compression spring 64. The cam follower element 86 is further provided with an L-shaped arm 86*b* which passes through an aperture 92 in the front wall 30 and is effective to engage the inner surface of the front wall 30 to limit the outward movement of the cam follower element 86. Moreover, the cam follower element 86 is provided with a convex cam portion 94 intermediate its ends. The cam assembly 70 is positioned on the selector shaft 52 relative to the cam follower element 86 and spaced therefrom such a distance so that the cam members 80 are selectively brought into engagement with the cam portion 94 of the cam follower element 86 at each of the channel selecting positions of the selector shaft 52 to provide the proper impedance of the variable impedance 56 at the particular selected channel. It will be understood that if the cam members 80 are screwed inwardly beyond their threaded limits, the hairpin spring 84 will rise out of the root of the threads in the threaded portion 82 of the cam members 80 and will ride over the crests to permit slippage of the cam member 80 without damage.

In order to adjust the individual independently adjustable member 80 associated with a particular selected channel, there is provided a gear train, represented generally at 96, and the clutch and gear assembly, hereinafter referred to as clutch assembly, and generally represented at 98, as best illustrated in FIGS. 2 to 5. The gear train 96 includes a driven gear 100 and a driving gear 102, each splined or otherwise secured to a rotatable shaft 104. The shaft 104 is rotatably mounted near the outer end of the legs of a generally U-shaped bracket 106; the legs of the bracket 106 near the inner end toward the bight portion thereof are pivotally mounted on a shaft 108 which may be supported by the side wall portion 90 from the chassis 28. In its disengaged or inoperative position illustrated in FIG. 4, the gear train 96 is biased with the driving gear 102 thereof out of engagement with the cam member 80 by a helical spring 110. The clutch assembly 98 is operative to pivot the gear train 96 into an engaged or operative position illustrated in FIGS. 3 and 5 about the shaft 108 toward the cam members 80 so that the driving gear 102 thereof engages a pinion gear or gear member 112 integrally formed with the cam members 80. Since the cam members 80 are adapted to thread axially in the cam assembly 70, and therefore axially with reference to the driving gear 102, the face 102*a* (FIG. 1) of the driving gear 102 has sufficient width to engage the pinion gear 112 throughout its axial movement.

The clutch assembly 98 is secured to one end of a fine tuning shaft 114 mounted for free rotation concentrically about the selector shaft 52. The outer end of the fine tuning shaft 114 is provided with a fine tuning knob 116 keyed or otherwise secured to the fine tuning shaft 114 to provide the manual rotation of the shaft 114. A tuning gear 118 is positioned on the fine tuning shaft 114 for rotation therewith and, in the illustrated embodiment, may be drivingly connected therewith through a dish-shaped spring 119, FIG. 6. The outer face of the tuning gear 118 contains a clutch facing 120 bonded or otherwise secured to the tuning gear 118. A fine tuning actuating plate 122 is rotatably mounted on the fine tuning shaft 114 and held against axial movement by a retainer 124. The dish-shaped spring 119 is effective to apply axial pressure between the actuating plate 122 and the tuning gear 118 through the clutch facing 120 so that manual rotation of the tuning gear 118 through the fine tuning shaft 114 is effective to provide a turning torque to the actuating plate 122 through the clutch facing 120; however, the axial load exerted by the spring 119 is light enough that slippage can occur between the actuating plate 122 and the tuning gear 118 when the restraining torque of the actuating plate 122 reaches a predetermined amount.

In order to move the gear train 96 into its engaged or operative position, so that the tuning gear 118 is in engagement with the driven gear 100 of the gear train 96, and so that the driving gear 102 of the gear train 96 is in engagement with the selected pinion gear 112, there is provided the generally V-shaped actuating spring 126 which interconnects the gear train 96 and the clutch assembly 98. Specifically, the actuating spring 126 has a center portion 128 (FIGS. 2 and 3) positioned over the shaft 104 formed by an interconnecting pair of legs 130 each provided with a hook portion 132 and 134 at their lower ends. Moreover, the actuating plate 122 is provided with a pair of hook portions 136 and 138 near opposite sides thereof so that the hook portions 136 and 138 in the actuating plate 122 are effective to engage a respective one of the hook portions 132 or 134 upon rotation of the actuating plate 122. Initial rotation of the actuating plate 122 is effective to engage one of the hook portions 132 or 134 of the actuating spring 126 to pivot the gear train 96 about the shaft 108, for example, from the disengaged or inoperative position illustrated in FIG. 2 to the engaged or operative position illustrated in FIG. 3. While the torque transmitted through the clutch facing 120 from the tuning gear 118 to the actuating plate 122 is sufficient to hold the gear train 96 in this operative position, the clutch facing 120 is effective to permit rotation of the tuning gear 118 relative to the actuating plate 122 upon further rotation of the fine tuning shaft 114.

From the above description of the memory tuning portion 26, the operation of the improved memory fine tuning means is believed clear. However, briefly, the oscillator circuit of the television tuner 20 is fine-tuned through the axial movement of the movable element 62 into or out of the support member 58 of the variable tuning impedance 56. The exact positioning of the movable element 62 is controlled through the pivotally mounted cam follower element 86 which is provided with a cam portion 94. The cam assembly 70 contains a plurality of axially positionable independently adjustable cam members 80 adjustable by engagement of the threads thereof with the hairpin type spring 84. One such cam member 80 is provided for each of the channel selecting positions of the selector shaft 52. In order to rotate the selected one of the cam members 80 in the cam assembly 70, the fine tuning knob 116 may be manually rotated in the desired direction. Assuming that the fine tuning knob 116 is rotated clockwise, as viewed in FIGS. 2 to 5, the clutch assembly 98 is initially rotated clockwise about the fine tuning shaft 115 so that the hook portion 138 of the actuating plate 122 engages the hook portion 134 of the actuating spring 126, drawing the actuating spring 126 downwardly and pivoting the gear train 96 about the shaft 108 so that the driven gear 100 of the gear train 96 engages the tuning gear 118. Simultaneously, the driving gear 102 of the gear train 96 will engage the pinion gear 112 on the particular one of the cam members 80 which represent the selected channel for the particular channel selecting position of the selector shaft 52. Continued rotation of the tuning gear 118 through manual operation of the fine tuning knob 116 will cause slippage between the friction clutch facing 120 and the actuating plate 122 so that the tuning gear 118 is rotated beyond the initial position without further movement of the actuating plate 122. The friction afforded between the clutch facing 120 and the actuating plate 122 is light enough to provide for slippage during the manual adjusting operation; but the frictional force is sufficient in magnitude to hold the gear train 96 in the engaged position illustrated in FIGS. 3 and 5. Upon release of the fine tuning knob 116, the torsion afforded by the helical spring 110 is effective to return the gear train 96 from the engaged position illustrated in FIGS. 3 and 5 to the disengaged or inoperative position illustrated in FIGS. 2 and 4. If the fine tuning knob 116 is manually rotated in the opposite or counterclockwise direction, the gear train 96 will, of course, again assume an operative position, being pivoted clockwise into engaged relation through the engagement of the hook portion 136 of the actuating plate 122 with the hook portion 132 of the actuating spring 126.

Figure 6:
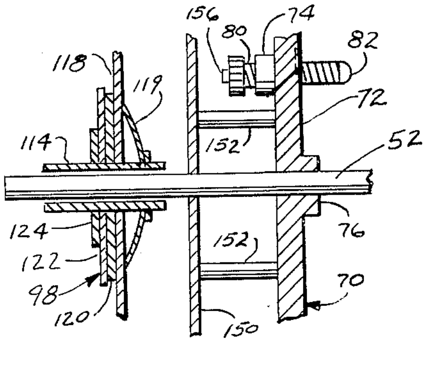
FIG. 6 is a top sectional view of the tuner of FIG. 1 taken along line 6—6 of FIG. 2 and illustrating the clutch arrangement in the fine tuning arrangement.
Figure 8:
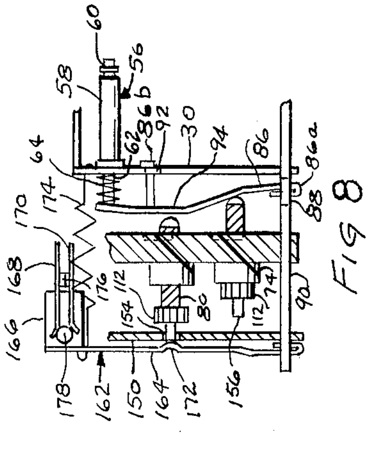
FIG. 8 is a partial sectional bottom view similar to FIG. 7 but illustrating one of the adjustable members in yet another of its operative positions.
Figure 9:
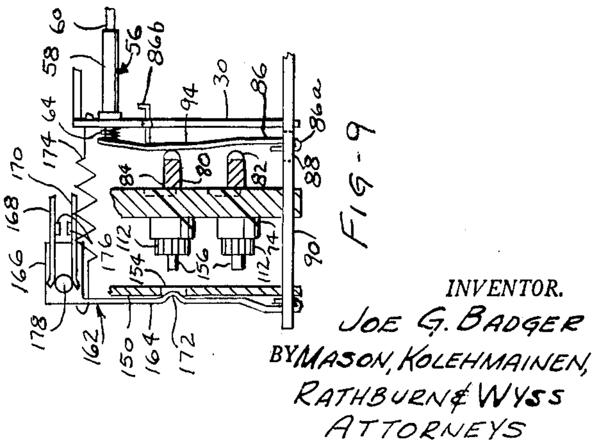
FIG. 9 is a partial sectional bottom view illustrating one of the adjustable members in yet another of its operative positions.
Figure 12:
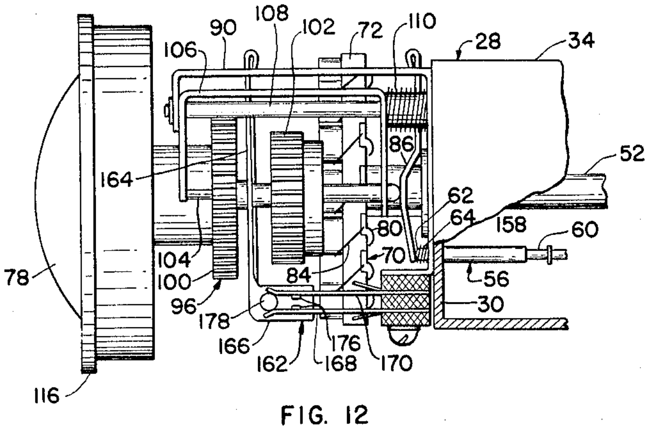
FIG. 12 is a partial plan view, partly in section, illustrating one of the motor control switches.

According to another aspect of the present invention, the memory tuning portion 26 is cooperable with a remote control channel selecting means to signal the motor drive portion 24 that the selector shaft 52 has reached the next selected channel position. It is to be understood that, as heretofore described, some of the channels represented by the channel selecting positions of the selector shaft 52 are beyond the range of the television receiving set and it is therefore desirable that the selector shaft 52, when actuated by remote control motor driven means, be effective to pass these channel selecting positions and stop at the next channel selecting position to which the television tuner 20 is preset by the operator to receive a signal. For this purpose, the cam assembly 70 includes a front cam or channel selector plate 150 drivingly connected to the back cam support plate 72 so as to rotate therewith in any convenient manner such as by the plurality of securing pins 152 (FIG. 6). The channel selector plate 150 is provided with a plurality of station selecting openings 154 (FIGS. 8 and 9) corresponding to and aligned with the cam members 80. The cam members 80 are each provided with a channel selecting extension rod or portion 156 which is aligned with its respective opening 154 and which is adapted to be positioned within the corresponding opening 154 to block or fill the opening when the cam member 80 is adjusted outwardly to its limiting position out of engagement with the cam follower element 86 of the memory tuning portion 26. When it is desired that a particular channel selecting position of the selector shaft 52 be effective to signal the motor means 24 to stop rotation of the selector shaft 52 during a motor driven operation thereof, it is merely necessary that the cam member 80 corresponding to the particular channel be adjusted inwardly sufficiently that the channel selecting extension 156 thereof be withdrawn from the station selecting opening 154 in the channel selector plate 150 as indicated in FIG. 9. Such adjustments may conveniently be made through the memory tuning portion 26 as heretofore described, the extension 156 being withdrawn from the opening 154 by initial movement of the fine tuning adjustment afforded by engagement of the cam member 80 with the cam follower elements 86. On the other hand, however, for the particular ones of the channels at which the motor means 24 is to pass up the channel selecting position of the selector shaft 52, the cam member 80 will be adjusted through the memory tuning portion 26 so that the cam member 80 thereof is threaded outwardly until the channel selecting extension 156 of that particular cam member 80 blocks or fills its corresponding opening 154, as illustrated by FIG. 8. Additional rotation of the cam element 80 beyond this outer limiting position is prevented through engagement of an extension 158 from the cam member 80 with a stop 160 on the channel selector plate 150 (FIG. 1).

Figure 7:
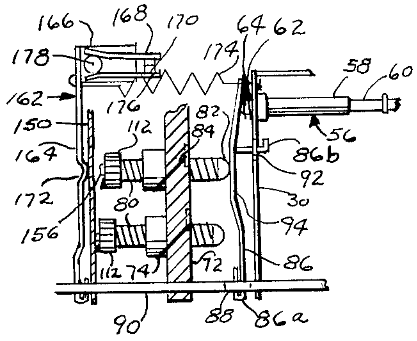
FIG. 7 is a partial sectional bottom view taken along line 7—7 of FIG. 1 and illustrating some of the adjustable members in one operating position.

In order to transmit to the motor drive portion 24 of the television tuner 20 the information relative to the position of the channel selecting extension 156 in the respective opening 154, there is provided switch means, shown generally at 162, FIGS. 7 to 9, and including a switch actuating blade 164 having one end thereof pivotally mounted in an opening in the side wall portion 90 and having an arm 166 at the other end thereof for actuating a pair of switch blades 168 and 170. The switch actuating blade 164 has a cam or detent 172 intermediate its ends adapted to ride on the surface of the channel selector plate 150, as illustrated in FIG. 7, and to fit into the channel selector openings 154 thereof which are not filled by the channel selecting extensions 156 of the cam members 80, as illustrated in FIG. 9. The switch actuating blade 164 is biased against the channel selector plate 150 by a tension spring 174. The switch actuating blade 164 will pivot in response to the engagement of the cam 172 thereon in the station selecting opening 154. However, as best illustrated in FIG. 8, when the cam 172 passes over openings 154 which are filled by extensions 156 of the cam members 80, the switch actuating blade 164 will ride over the end surface of the extensions 156 and will not be responsive to that station selecting opening 154.

In order to transform the pivotal motion of the switch actuating blade 164 into an electric signal transmitted to control the motor means 24, each of the switch blades 168 and 170 is provided with an electrical contact 176 which are normally separated from engagement by an insulating plug 178 carried by the arm 166 and positioned between the blades 168 and 170 when the switch actuating blade 164 is in its de-energized or at rest position with the cam 172 thereof in one of the station selecting openings 154, as illustrated in FIG. 9.

The operation of the switch means 162 is believed to be clear from the above description. However, briefly, with the channel selector shaft 52 at one of the channel selecting positions in which the corresponding cam member 80 is adjusted inwardly for purposes of fine-tuning the channel, the channel selecting extension 156 associated with that cam member 80 will be out of the station selecting opening 154 so that the switch actuating blade 164 is biased to the right, as illustrated in FIG. 9, by the spring 174 with the cam 172 positioned in the opening 154. In this position, the contacts 176 of the switch are separated and the switch is opened. However, rotation of the selector shaft 52 will rotate the channel selector plate 150 so that the cam 172 on the switch actuating blade 164 moves out of the opening 164, the switch actuating blade 164 then pivoting counterclockwise against the return bias of the tension spring 174 so that the insulating plug 178 is moved out of engagement with the switch blades 168 and 170 and the electrical contacts will come into engagement due to the natural resiliency of the switch blades 168 and 170 and the electrical circuit through the switch contacts 176 will be closed. The switch contacts 176 will remain in engagement with the switch means 162 in a closed position until an opening 154 is brought into alignment with the cam 172 on the switch actuating blade 164 which is not filled by an extension 156 on its corresponding cam member 80. At this time, the switch actuating blade 164 will move clockwise under the bias of a spring 174, thereby moving the insulating plug 178 between the switch blades 168 and 170 and separating the electrical contact 176.

Figures 10, 11:
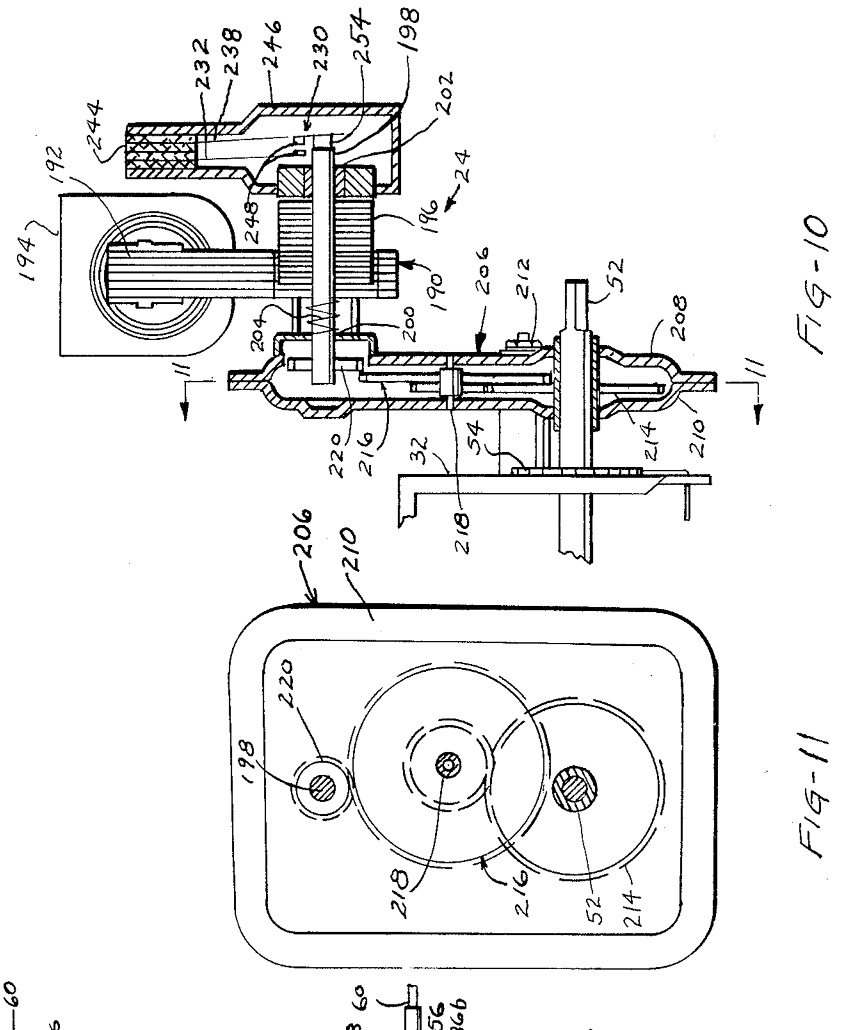
FIG. 10 is a partial side sectional elevational view illustrating the motor means for driving the selector shaft.
FIG. 11 is a partial sectional back view of the motor means taken along line 11—11 of FIG. 10.

In order to automatically rotate the selector shaft 52 in response to an appropriate signal, such as a remote control signal, there is provided the motor drive portion 24 (FIGS. 1 and 10) of the television tuner 20. The motor drive portion 24 includes a thrust type driving motor 190 including a stator pole piece 192 of generally U-shape and having its ends spaced apart forming an air gap. A field winding 194 is positioned on the bight portion of the stator 192. The motor 190 further includes an armature 196 mounted on a drive shaft 198 which is supported between a pair of bearings 200 and 202. The bearings 200 and 202 are spaced apart a greater distance than the width of the armature 196 so that in the de-energized or inoperative position the armature 196 is biased by a spring 204 toward one of the bearings 202 so as to be off-center or out of line with respect to the pole piece 192 as best illustrated in FIG. 10. As is well known, an initial energization of the field winding 194 produces an end thrust on the armature 196 so that the armature tends to center itself within the stator 192, i.e., the armature 196 will have a side thrust applied to it during energization of the field winding 194 which will move the armature 196 to the left in FIG. 10 against the return bias of the compression spring 204.

In order to transmit the driving torque from the drive shaft 198 of the motor 190 to the main shaft 52 of the television tuner 20, there is provided a gear train shown generally at 206. The gear train 206 includes a pair of housing members 208 and 210 fixedly secured to the end wall 32 of the chassis 28 by a plurality of fastening means such as the studs 212 and housing the gear components hereinafter described. The driving gears of the gear train 206 include a pinion gear 214 keyed or otherwise secured to the channel selector shaft 52 extending within the housing members 208 and 210 and an idler gear assembly 216 operatively engaging the pinion gear 214 and positioned between the housing members 208 and 210 rotatably mounted on an idler shaft 218 supported at its ends by the housing members 208 and 210. Keyed or otherwise secured to the end of the drive shaft 198 between the housing members 208 and 210 is a drive pinion 220 which, in the inoperative or at rest position of the armature 196, is axially disposed out of engagement with the idler gear assembly 216 but which is adapted to engage the idler gear assembly 216 when the drive shaft 198 moves axially to the left, as viewed in FIG. 10, during energization of the field winding 194 so as to drivingly engage the idler gear assembly 216. In this manner the motor 190 is drivingly connected to the selector shaft 52 through the gear train 206 only while the field winding 194 of the motor 190 is energized; when the field winding 194 thereof is not energized, the bias of the spring 204 is effective to axially move the armature 196 to the right as viewed in FIG. 10 so that the drive pinion 220 secured thereon is moved axially out of engagement with the idler gear 216. In this manner, the selector shaft 52 is instantly disengaged from the motor 190 when the power thereto is shut off, and the inertia of the armature 196 cannot carry the shaft 52 past its channel selecting position.

In order to prevent energization of the control circuit for the motor drive portion 24 during a manual rotation of the selector shaft 52 by closure of the switch means 162, there is provided a second switch means shown generally at 230 and fixedly secured to the housing of the motor 190 so as to be actuated by the axial movement of the armature 196 through the drive shaft 198. As illustrated, the switch means 230 includes a stationary switch blade 232 and a movable switch blade 238 having their ends secured in spaced apart electrically isolated relation by an insulator block 244 mounted or otherwise secured to an extension 246 fixedly secured to the housing of the motor 190. The switch blades 232 and 238 are provided with a pair of electrical contacts 248 near their free end which, when the field winding 194 is de-energized, are normally spaced apart so as to form a normally open switch for the purpose of controlling the motor control portion 24 of the television tuner 20. The movable switch blade 238 is biased to the left as viewed in FIGS. 1 and 7, due to the natural resiliency of the switch blade itself. However, when the armature 196 is in the de-energized position, so that the drive shaft 198 is biased toward the right, the right end of the drive shaft 198 engages the free end of the movable switch blade 238 through an insulating member 254. However, once the armature 196 moves to the left upon energization of the field winding 194, the right end of the drive shaft 198 moves to the left out of engagement with the free end of the movable switch blade 238 and the electrical contacts 248 of the switch means 230 are closed. It will be understood that, immediately upon de-energization of the field winding 194, the armature 196 and drive shaft 198 secured thereto move to the right, as viewed in FIGS. 1 and 10, under the bias of the spring 204 and separate the contacts 248 to open the electrical circuit thereto.

Figure 13:
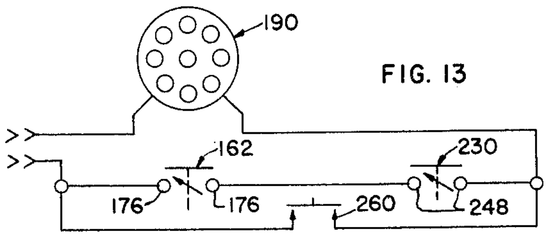
FIG. 13 is a schematic view of the remote control electrical system.

The electrical control system for the motor control means 24 is illustrated diagramatically in FIG. 13. The switch formed by the contacts 176 of the switch means 162 and the switch means formed by the contacts 248 of the switch means 230 are serially connected in series with the motor 190. An impulse type starting switch illustrated generally at 260 and which may consist of a push type switch, is connected across the switch means 162 and 230 so as to shunt across the pair of contacts 176 and 248 when held in its closed position. Momentary closing of the starting switch 260 energizes the field winding 194 moving the armature 196 and drive shaft 198 of the motor 190 to the left, as viewed in FIGS. 1 and 10, closing the contacts 248 of the switch means 230. Immediately upon energization of the field winding 194, a drive torque is applied to the armature 196 which has now moved to the left as viewed in FIGS. 1 and 10 so that the drive pinion 220, which has moved to engage the idler 216, rotates the selector shaft 52. Initial rotation of the selector shaft 52 moves the cam 172 out of the station selecting opening 154 on the channel selector plate 150, pivoting the switch actuating blade 164 so that the insulating plug 178 is moved from between the blades 168 and 170 of the switch means 162, thereby closing the switch formed by the contacts 176. The starting switch 260 may now be released and the electrical circuit to the motor 190 is maintained through the switch means 162 and 230. The cam 172 will ride on the surface of the channel selector plate 150 as illustrated in FIG. 7 and will pass over any of the channel selector openings 154 which are filled with a channel selecting extension 156 of the cam members 80 as illustrated in FIG. 8. However, whenever the channel selector plate 150 has been rotated to a channel selecting position representing a preselected receiving channel, the channel selecting extension of the cam member 80 does not fill the channel selecting opening 154 of the channel selecting plate, and the cam 172 drops in that station selecting opening, as illustrated in FIG. 9, thereby pivoting the actuating blade 164 and opening the contacts 176 to de-energize the field winding 194. Immediately upon de-energization of the field winding 194, the axial thrust on the armature 196 is removed and the armature 196 is moved to the right, as viewed in FIGS. 1 and 7, thereby separating the electrical contacts 248 and rendering the drive connection between the drive pinion 220 and the idler 216 ineffective.

The separation of the electrical contacts 248 prevents energization of the electrical circuits by a manual rotation of the channel selector 52 to a desired channel selecting position. It will be appreciated that initial rotation of the selector shaft 52 manually will cause the cam 172 to rise out of the station selecting opening 154, thereby closing the electrical contacts 176. Under these conditions, the open switch means 230 prevents energization of the motor drive portion of the television tuner 20.

Figures 14, 15:
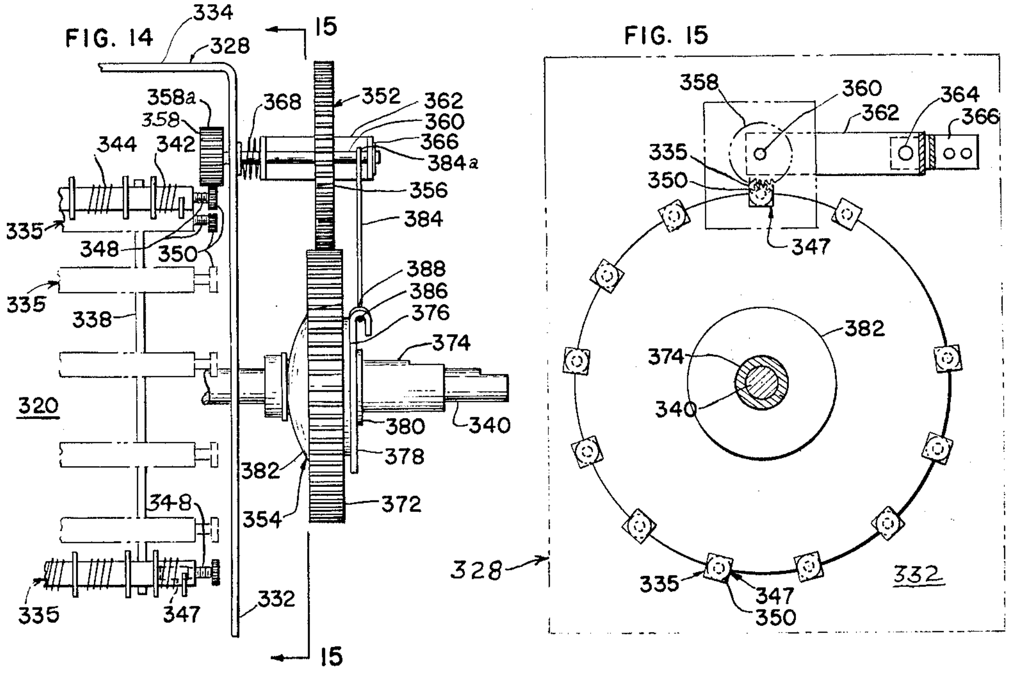
FIG. 14 is a side view of another embodiment of a fine tuning arrangement according to the present invention with certain parts removed for clarity.
FIG. 15 is a sectional front view taken along line 15—15 of FIG. 14, and illustrated with certain parts thereof shown in phantom for clarity.

Although the embodiment of FIGS. 1 to 13 illustrates a tuner wherein a single vernier tuning impedance is automatically adjusted to the desired value for each channel selecting position of the selector shaft, it is to be understood that the principles of the present invention are equally applicable to other types of tuners, for example, to a turret tuner of the type illustrated in a copending Krepps et al., application Serial No. 708,594 filed January 13, 1958, wherein individual coil assemblies are provided for each channel, these coil assemblies being removably mounted in a rotatable turret structure. As disclosed in said Krepps et al, copending application, each coil assembly is provided with an oscillator coil the inductance of which may be adjusted by means of a threaded slug which extends into an opening in the end of the coil assembly adjacent the oscillator coil. More particularly, as shown in FIGS. 14 and 15, such a turret tuner 320 comprises a plurality of coil assemblies 335 which are mounted on a plurality of insulating discs 338, one of which is shown in FIGS. 14 and 15, these discs being fixedly secured to the channel selector shaft 340. The television tuner 320 includes a substantially U-shaped chassis 328 having a front wall 332 and a top deck portion 334 on which are mounted the various circuit components. Each of the coil assemblies includes an oscillator coil 342 as well as RF and mixer coils, one of the latter of which is shown at 344, it being understood that the coils on a particular coil assembly are selectively engaged with the contacts of a fixed stator bar (not shown) as the channel selector shaft 340 is rotated to the different channel selecting positions so that the coils on a particular coil assembly are inserted at the appropriate points in the tuner circuit. The oscillator coil 342 is tuned by means of a threaded slug 347 which extends into the end of the coil assembly to a point within the oscillator coil 342. In accordance with the present invention, the slug 347 is provided with a portion 348 which extends out of the end of the coil assembly and carries a pinion gear 350 on the end thereof. The gear 350 may be selectively engaged in a manner described in more detail hereinafter to position the slug 347 with respect to the coil 342 and hence provide a fine or vernier tuning adjustment for the particular channel corresponding to the particular coil assembly which is being adjusted. It will be understood of course that rotation of each pinion gear 350 will be effective to vary the reactance of each individual oscillator coil 342 on the separate coil assemblies.

In order to provide for manual adjustment of each individually adjustable slug 347 associated with a particular selected channel position, there is provided a gear train represented generally at 352 and the clutch and gear assembly, hereinafter referred to as the clutch assembly, and generally represented at 354. The gear train 352 includes a driven gear 356 and a driving gear 358, each splined or otherwise secured to a shaft 360. The shaft 360 is rotatably mounted near the outer end of the legs of a generally U-shaped bracket 362; the legs of the bracket 362 near the inner end thereof are pivotally mounted on a shaft 364 which may be supported by a bracket 366 extending from the side wall portion 332 of chasis 328. In disengaged or inoperative position, the gear train 352 is biased with the driving gear 358 thereof out of engagement with the pinion gear 350 by a helical spring 368; however, as herein illustrated, the depth of the teeth in the driven gear 356 is sufficiently large so that the driven gear 356 is never fully disengaged from a fine tuning gear 372. The clutch assembly 354 is operative to pivot the gear train 352 into the engaged or operative position illustrated in FIGS. 14 and 15 about the shaft 364 so that the driving gear 358 thereof engages a respective pinion gear 350 integrally formed with the threaded slug 347. Since the threaded slugs 347 are adapted to thread axially in the coil assemblies 335, and therefore axially with reference to the driving gear 358, the face 358*a* (FIG. 14) of the driving gear 358 has sufficient width to engage the pinion gear 350 throughout its axial movement.

The clutch assembly 354 is identical with the clutch assembly 98 illustrated and described in connection with the embodiment of FIGS. 1 to 13. However, briefly, the clutch assembly 354 is secured to the inner end of a fine tuning shaft 374 mounted for free rotation concentrically about the selector shaft 340. The fine tuning gear 372 is positioned on the fine tuning shaft 374 and is drivingly connected therewith. The outer face of the tuning gear 372 contains a clutch facing 376 bonded or otherwise secured to the tuning gear 372. A fine tuning actuating plate 378 is rotatably mounted on the fine tuning shaft 374 and held against axial movement by a retainer 380. A dish-shaped spring 382 is effective to apply axial pressure between the actuating plate 378 and the tuning gear 372 through the clutch facing 376 so that manual rotation of the tuning gear 372 through the fine tuning shaft 374 is effective to provide a turning torque to the actuating plate 378 through the clutch facing 376; however, the axial load exerted by the spring 382 is small enough that slippage can occur between the actuating plate 378 and the tuning gear 372 when the restraining torque of the actuating plate 378 reaches a predetermined amount.

In order to pivot the gear train 352 about the shaft 364 into its engaged or operative position, so that the driving gear 358 is in engagement with the pinion gear 350, there is provided the generally V-shaped actuating spring 384 which interconnects the gear train 352 and the clutch assembly 354. The actuating spring 384 is identical to the actuating spring 126 in the embodiment of FIGS. 1 to 13 and need not be fully described. However, the actuating spring 384 has a center portion 384*a* positioned over the shaft 360. Each of the legs of the actuating spring 384 terminates in a hook portion 386. Moreover, the actuating plate 378 is provided with a pair of hook portions 388 which are effective to engage a respective one of the hook portions 386 upon rotation of the actuating plate 378. As heretofore described, initial rotation of the actuating plate 378 is effective to engage one of the hook portions 386 of the actuating spring 384 to pivot the gear train 352 about the shaft 364, for example, from its disengaged or inoperative position to the engaged or operative position illustrated in FIGS. 14 and 15. While the torque transmitted through the clutch facing 376 from the tuning gear 372 to the actuating plate 378 is sufficient to hold the gear train 362 in this operative position, the clutch facing 376 is effective to permit rotation of the tuning gear 372 relative to the actuating plate 378 upon further rotation of the fine tuning shaft 374.

From the above description of the memory fine tuning portion illustrated in FIGS. 14 and 15, the operation of the improved memory fine tuning means is believed clear. However, briefly, in order to rotate a selected one of the threaded slugs 347 relative to its respective coil assembly 335, the fine tuning shaft 374 is manually rotated in the desired direction. As heretofore described it will be appreciated that initial rotation of the fine tuning shaft 374 in either direction will be effective to rotate the actuating plate 378 without slippage so that the hook portion 388 on the actuating plate 378 will engage the hook portion 386 on the actuating spring 384 and will rotate the bracket 362 into the engaged position illustrated in FIGS. 14 and 15. This movement occurs when the tuning shaft 374 is rotated in either direction. Such initial rotation of the fine tuning shaft 374 and pivotal movement of the bracket 362 is effective to bring the driving gear 358 into driving engagement with the pinion gear 350 for the selected one of the channel selecting positions of the selector shaft 340. Continued rotation of the fine tuning shaft 374 will be effective to cause slippage between the shaft 374 and the actuating plate 378 and at the same time will be effective to drive the fine tuning gear 372 in the direction of rotation thereof, thereby to drive the selected one of the pinion gears 350 through the gear train 352 in a manner heretofore described in connection with the embodiment of FIGS. 1 to 13. Moreover, it will be appreciated that the clutch assembly 354 is effective to provide a turning and holding torque on the actuating plate 378 thereby to maintain the gear train 252 in operative relation with the pinion gear 350 so long as the turning torque is applied or held on the fine tuning shaft 374; however the load exerted through the clutch facing 376 is small enough that slippage can occur between the actuating plate 378 and the fine tuning gear 372 when the restraining torque on the actuating plate 378 reaches a predetermined amount.

Moreover, it will be appreciated that the memory fine tuning mechanism illustrated in FIGS. 14 and 15 may be substituted for the memory fine tuning mechanism in the embodiment of FIGS. 1 to 13 and that the system may thereby include a motor drive portion operatively associated with a selector plate similar to selector plate 150 and operatively associated with the gears 350 to provide for motor driving of the selector shaft 340 which is effective to pass certain channel selecting positions and to stop at the next channel selecting position to which the television tuner 320 has been preset by the operator by the axial positioning of the spur gears 350 to receive a television signal.

The above-described television tuner provides a memory fine tuning arrangement resulting in maximum flexibility of the drive arrangement and of the fine tuning drive means. Moreover, the memory fine tuning of the set is readily adjustable by a viewer from outside the cabinet by the mere rotation of the fine tuning knob concentrically positioned on the channel selector shaft. The memory disc and the independently adjustable fine tuning cam members cooperate to provide desired positioning signals for the automatic shaft rotating mechanism such as for a remote control motor drive.

While certain preferred embodiments of the invention have been described by way of illustration, many modifications will occur to those skilled in the art. It will be understood, of course, that it is not desired that the invention be limited thereto since modifications may be made, and it is, therefore contemplated by the appended claims to cover any such modifications as fall within the true spirit and scope of the invention.

Having thus described the invention, what is claimed as new and desired to be secured by Letters Patent of the United States is:

1. In a television tuner, the combination of, a channel selector shaft rotatable to a plurality of channel selecting positions, a support structure rotatable with said selector shaft and carrying a plurality of individually adjustable gear elements for fine tuning adjustment to different television channels, a fine tuning shaft concentric with said selector shaft, said adjustable gear elements moving in a predetermined path around said selector shaft as said support structure is rotated, a fine tuning gear secured to said fine tuning shaft, a movable member, an auxiliary shaft journalled for rotation in said movable member and bodily movable therewith, first gear means on said auxiliary shaft and positioned outside said predetermined path of said adjustable gear elements, means for interconnecting said auxiliary shaft and said fine tuning gear, an actuating plate rotatably mounted on said fine tuning shaft, slip clutch means interconnecting said actuating plate and said fine tuning shaft, and means responsive to rotation of said actuating plate upon initial rotation of said fine tuning shaft in either direction for moving said movable member so that said first gear means is moved inwardly into engagement with a selected one of said adjustable gear elements and said interconnecting means is moved into engagement with said fine tuning gear, said slip clutch means acting upon the application of additional torque to said fine tuning shaft in the same direction to disengage said actuating plate from said fine tuning shaft thereby to permit adjustment of said selected gear element while maintaining said first gear means in engagement therewith upon further rotation of said fine tuning shaft in said same direction.

2. In a television tuner, the combination of, a channel selector shaft rotatable to a plurality of channel selecting positions, a support structure rotatable with said selector shaft and carrying a plurality of individually adjustable gear elements for fine tuning adjustment to different television channels, a fine tuning shaft concentric with said selector shaft, said adjustable gear elements moving in a predetermined path around said selector shaft as said support structure is rotated, a fine tuning gear secured to said fine tuning shaft, a movable member, an auxiliary shaft journalled for rotation in said movable member and bodily movable therewith, first gear means on said auxiliary shaft and positioned outside said predetermined path of said adjustable gear elements, means driven from said auxiliary shaft and engageable with said fine tuning gear, an actuating plate rotatably mounted on said fine tuning shaft, slip clutch means interconnecting said actuating plate and said fine tuning shaft, a pair of spaced apart projections on said actuating plate, and means responsive to movement of said projections upon initial rotation of said fine tuning shaft in either direction for moving said movable member so that said first gear means is moved inwardly into engagement with a selected one of said adjustable gear elements and said driven means is moved into engagement with said fine tuning gear, said slip clutch means acting upon the application of additional torque to said fine tuning shaft in the same direction to disengage said actuating plate from said fine tuning shaft thereby to permit adjustment of said selected gear element while maintaining said first gear means in engagement therewith upon further rotation of said fine tuning shaft in said same direction.

3. In a television tuner, the combination of, a channel selector shaft rotatable to a plurality of channel selecting positions, a support structure rotatable with said selector shaft and carrying a plurality of individually adjustable gear elements for fine tuning adjustment to different television channels, a fine tuning shaft concentric with said selector shaft, said adjustable gear elements moving in a predetermined path around said selector shaft as said support structure is rotated, a fine tuning gear secured to said fine tuning shaft, a movable member, an auxiliary shaft journalled for rotation in said movable member and bodily movable therewith, first gear means on said auxiliary shaft and positioned outside said predetermined path of said adjustable gear elements, second gear means driven from said auxiliary shaft and engageable with said fine tuning gear, an actuating plate rotatably mounted on said fine tuning shaft, slip clutch means between said actuating plate and said fine tuning shaft, a pair of lugs on said actuating plate and positioned on opposite sides of said fine tuning shaft, and means responsive to movement of either of said lugs upon initial rotation of said fine tuning shaft in either direction for moving said movable member so that said first gear means is moved inwardly into engagement with a selected one of said adjustable gear elements and said second gear means is moved into engagement with said fine tuning gear, said slip clutch means acting upon the application of additional torque to said fine tuning shaft in the same direction to disengage said actuating plate from said fine tuning shaft, thereby to permit adjustment of said selected gear element upon further rotation of said fine tuning shaft in the same direction while maintaining said first gear means in engagement therewith.

4. In a television tuner, the combination of, a channel selector shaft rotatable to a plurality of channel selecting positions, a support structure rotatable with said selector shaft and carrying a plurality of individually adjustable gear elements for fine tuning adjustment to different television channels, a fine tuning shaft concentric with said selector shaft, said adjustable gear elements moving in a predetermined path around said selector shaft as said support structure is rotated, a fine tuning gear secured to said fine tuning shaft, a movable member, an auxiliary shaft journalled for rotation in said movable member and bodily movable therewith, first gear means on said auxiliary shaft and positioned outside said predetermined path of said adjustable gear elements, second gear means driven from said auxiliary shaft and engageable with said fine tuning gear, an actuating plate rotatably mounted on said fine tuning shaft, slip clutch means between said actuating plate and said fine tuning shaft, a pair of lugs on said actuating plate and positioned on opposite sides of said fine tuning shaft, and means responsive to movement of either of said lugs upon initial rotation of said fine tuning shaft in either direction for moving said movable member so that said auxiliary shaft is moved toward said selector shaft while remaining parallel thereto, said first gear means being moved inwardly into engagement with a selected one of said adjustable gear elements and said second gear means being moved into engagement with said fine tuning gear upon said inward movement of said member, said slip clutch means acting upon the application of additional torque to said fine tuning shaft in the same direction to disengage said actuating plate from said fine tuning shaft, thereby to permit adjustment of said selected gear element upon further rotation of said fine tuning shaft in the same direction while maintaining said first gear means in engagement therewith.

5. In a television tuner, the combination of, a channel selector shaft rotatable to a plurality of channel selecting positions, a support structure rotatable with said selector shaft and carrying a plurality of individually adjustable gear elements for fine tuning adjustment to different television channels, a fine tuning shaft concentric with said selector shaft, said adjustable gear elements moving in a predetermined path around said selector shaft as said support structure is rotated, a fine tuning gear secured to said fine tuning shaft, a movable member, an auxiliary shaft journalled for rotation in said movable member and bodily movable therewith, a first gear on said auxiliary shaft and positioned outside said predetermined path of said adjustable gear elements, a second gear on said auxiliary shaft and engageable with said fine tuning gear, an actuating plate rotatably mounted on said fine tuning shaft, slip clutch means between said actuating plate and said fine tuning gear, a pair of lugs on the periphery of said actuating plate and positioned on opposite sides of said fine tuning shaft, and means responsive to movement of either of said lugs upon initial rotation of said fine tuning shaft in either direction for moving said movable member so that said first gear is moved inwardly into engagement with a selected one of said adjustable gear elements and said second gear is moved into engagement with said fine tuning gear, said slip clutch means acting upon the application of additional torque to said fine tuning shaft in the same direction to disengage said actuating plate from said fine tuning gear, thereby to permit adjustment of said selected gear element upon further rotation of said fine tuning shaft in the same direction while maintaining said first gear in engagement therewith.

6. In a television tuner, the combination of, a channel selector shaft rotatable to a plurality of channel selecting positions, a support structure rotatable with said selector shaft and carrying a plurality of individually adjustable gear elements for fine tuning adjustment to different television channels, a fine tuning shaft concentric with said selector shaft, said adjustable gear elements moving in a predetermined path around said selector shaft as said support structure is rotated, a fine tuning gear secured to said fine tuning shaft, a movable member, an auxiliary shaft positioned parallel to but offset from said selector shaft and journalled for rotation in said movable member and bodily movable therewith, a first gear on said auxiliary shaft and positioned outside said predetermined path of said adjustable gear elements, a second gear on said auxiliary shaft and engageable with said fine tuning gear, an actuating plate rotatably mounted on said fine tuning shaft, slip clutch means between said actuating plate and said fine tuning gear, a pair of lugs on the periphery of said actuating plate and positioned on opposite sides of said fine tuning shaft, and means responsive to movement of either of said lugs upon initial rotation of said fine tuning shaft in either direction for moving said movable member so that said auxiliary shaft is moved toward said selector shaft while remaining parallel thereto, said first gear is moved inwardly into engagement with a selected one of said adjustable gear elements and said second gear is moved into engagement with said fine tuning gear, said slip clutch means acting upon the application of additional torque to said fine tuning shaft in the same direction to disengage said actuating plate from said fine tuning gear, thereby to permit adjustment of said selected gear element upon further rotation of said fine tuning shaft in the same direction while maintaining said first gear in engagement therewith.

7. In a television tuner, the combination of, a channel selector shaft rotatable to a plurality of channel selecting positions, a support structure rotatable with said selector shaft and carrying a plurality of individually adjustable gear elements for fine tuning adjustment to different television channels, a fine tuning shaft concentric with said selector shaft, said adjustable gear elements moving in a predetermined path around said selector shaft as said support structure is rotated, a fine tuning gear secured to said fine tuning shaft, a movable member, an auxiliary shaft positioned parallel to but offset from said selector shaft and journalled for rotation in said movable member and bodily movable therewith, a first gear on said auxiliary shaft and positioned outside said predetermined path of said adjustable gear elements, a second gear on said auxiliary shaft and normally positioned so that only the tips of the teeth thereof engage the tips of the teeth of said fine tuning gear, an actuating plate rotatably mounted on said fine tuning shaft, slip clutch means between said actuating plate and said fine tuning gear, a pair of lugs on the periphery of said actuating plate and positioned on opposite sides of said fine tuning shaft, and means responsive to movement of either of said lugs upon initial rotation of said fine tuning shaft in either direction for moving said movable member so that said auxiliary shaft is moved toward said selector shaft while remaining parallel thereto, said first gear is moved inwardly into engagement with a selected one of said adjustable gear elements and said second gear is moved into substantially full engagement with said fine tuning gear, said slip clutch means acting upon the application of additional torque to said fine tuning shaft in the same direction to disengage said actuating plate from said fine tuning gear, thereby to permit adjustment of said selected gear element upon further rotation of said fine tuning shaft in the same direction while maintaining said first gear in engagement therewith.

8. In a television tuner, the combination of, a channel selector shaft rotatable to a plurality of channel selecting positions, a support structure rotatable with said selector shaft and carrying a plurality of individually adjustable gear elements for fine tuning adjustment to different television channels, a fine tuning member concentric with said selector shaft, said adjustable gear elements moving in a predetermined path around said selector shaft as said support structure is rotated, a fine tuning gear secured to said fine tuning member, a movable member, an auxiliary shaft journalled for rotation in said movable member and bodily movable therewith, first gear means on said auxiliary shaft and positioned outside said predetermined path of said adjustable gear elements, means for interconnecting said auxiliary shaft and said fine tuning gear, an actuating member, slip clutch means interconnecting said actuating member and said fine tuning member so that said actuating member is movable with said fine tuning member, and means responsive to rotation of said actuating member upon initial rotation of said fine tuning member in either direction for moving said movable member so that said first gear means is moved inwardly into engagement with a selected one of said adjustable gear elements, while said auxiliary shaft remains parallel to said selector shaft, said slip clutch means acting upon the application of additional torque to said fine tuning member in the same direction to cause said fine tuning member to slip with respect to said actuating member, thereby the permit adjustment of said selected gear element through said interconnecting means upon further rotation of said fine tuning member in said same direction while maintaining said first gear means in engagement with said selected gear element.

9. In a television tuner, the combination of, a channel selector shaft rotatable to a plurality of channel selecting positions, a support structure rotatable with said selector shaft and carrying a plurality of individually adjustable gear elements for fine tuning adjustment to different television channels, a fine tuning member concentric with said selector shaft, said adjustable gear elements moving in a predetermined path around said selector shaft as said support structure is rotated, a fine tuning gear secured to said fine tuning member, a movable member, an auxiliary shaft journalled for rotation in said movable member and bodily movable therewith, first gear means on said auxiliary shaft and positioned outside said predetermined path of said adjustable gear elements, means for interconnecting said auxiliary shaft and said fine tuning gear, an actuating member having a pair of spaced apart drive means, slip clutch means interconnecting said actuating member and said fine tuning member so that said actuating member is movable with said fine tuning member, and means responsive to movement of either of said drive means when said actuating member is rotated upon initial rotation of said fine tuning member in either direction for moving said movable member so that said first gear means is moved inwardly into engagement with a selected one of said adjustable gear elements while said auxiliary shaft remains parallel to said selector shaft, said slip clutch means acting upon the application of additional torque to said fine tuning member in the same direction to cause said fine tuning member to slip with respect to said actuating member, thereby to permit adjustment of said selected gear element through said interconnecting means upon further rotation of said fine tuning member in said same direction while maintaining said first gear means in engagement with said selected gear element.

References Cited by the Examiner

UNITED STATES PATENTS

| | | | |
|---|---|---|---|
| 2,805,379 | 9/1957 | Troeller et al. | 250—40 |
| 2,956,161 | 10/1960 | Cady. | |
| 2,965,829 | 12/1960 | Lingenbrink | 250—40 |
| 2,981,838 | 4/1961 | Poskozim | 250—40 |
| 3,022,674 | 2/1962 | Cross et al. | 74—10.85 |
| 3,058,075 | 10/1962 | Polley | 334—51 |

FOREIGN PATENTS

| | | | |
|---|---|---|---|
| 160,318 | 3/1941 | Austria. | |

HERMAN KARL SAALBACH, *Primary Examiner.*

HARRY GAUSS, *Examiner.*